United States Patent
O'Brien

[11] 3,811,574
[45] May 21, 1974

[54] SADDLE HANGER
[76] Inventor: John R. O'Brien, 321 E. La Diosa Dr., Tempe, Ariz. 85282
[22] Filed: Dec. 22, 1972
[21] Appl. No.: 317,694

[52] U.S. Cl.................... 211/13, 211/94, 214/450
[51] Int. Cl............................................. B60r 11/00
[58] Field of Search...... 211/13, 94, 113, 162, 94.5; 248/341, 339, 340; 214/450; 272/61

[56] References Cited
UNITED STATES PATENTS
3,294,267  12/1966  Schweigert........................ 214/450
3,476,255  11/1969  Ciancio................................ 211/13
2,809,755  10/1957  Nartorello........................... 211/13

Primary Examiner—Roy D. Frazier
Assistant Examiner—Robert W. Gibson, Jr.

[57] ABSTRACT

A saddle hanger is disclosed incorporating an elongated support beam movably mounted within a saddle compartment; the support beam being extendable out of the compartment through an opening therein. An elongated saddle support bar is suspended from the support beam and a plurality of flexible saddle support lines are attached to the beam at one end and detachably secured to the beam at the other end to permit the line to engage the saddlebow of a saddle.

7 Claims, 5 Drawing Figures

SADDLE HANGER

The present invention pertains to saddle hangers or saddle racks, and more particularly, to saddle mounting means for mounting the saddle within an enclosed compartment.

Most horse trailers incorporate an enclosed compartment for the storage of saddles and tack. A variety of structures have been proposed in the prior art for incorporating saddle racks in the compartment; however, the racks must be strong enough to support two saddles while nevertheless not being so bulky as to occupy too much of the relatively small space available in the compartment.

It has been suggested that a saddle rack be mounted in such a manner as to be extendable out of the compartment to facilitate mounting the saddles thereon. Prior art structures incorporating this technique are invariably bulky and very heavy (the weight necessitated by the need for strength since the racks are invariably supported in cantilever fashion).

Horse trailers are frequently pulled over extremely rough terrain which results in the saddles being jarred from their supported position on the saddle racks.

It is therefore an object of the present invention to provide saddle supporting means for mounting saddles within an enclosed compartment.

It is a further object of the present invention to provide saddle supporting means for mounting saddles within an enclosed compartment wherein the apparatus for supporting the saddle is lightweight and occupies a minimum amount of space.

Still another object of the present invention is to provide saddle supporting means for mounting saddles within an enclosed compartment, and wherein the supporting apparatus may readily be extended out of the compartment while the saddles may be secured thereto.

A still further object of the present invention is to provide saddle supporting means for mounting saddles within an enclosed compartment wherein each saddle is secured to the saddle supporting apparatus and prevented from being dislodged therefrom regardless of the terrain over which the horse trailer is drawn.

These and other objects of the present invention will become apparent to those skilled in the art as the description thereof proceeds.

The present invention may be described by reference to the accompanying drawings, in which.

Figure 1:
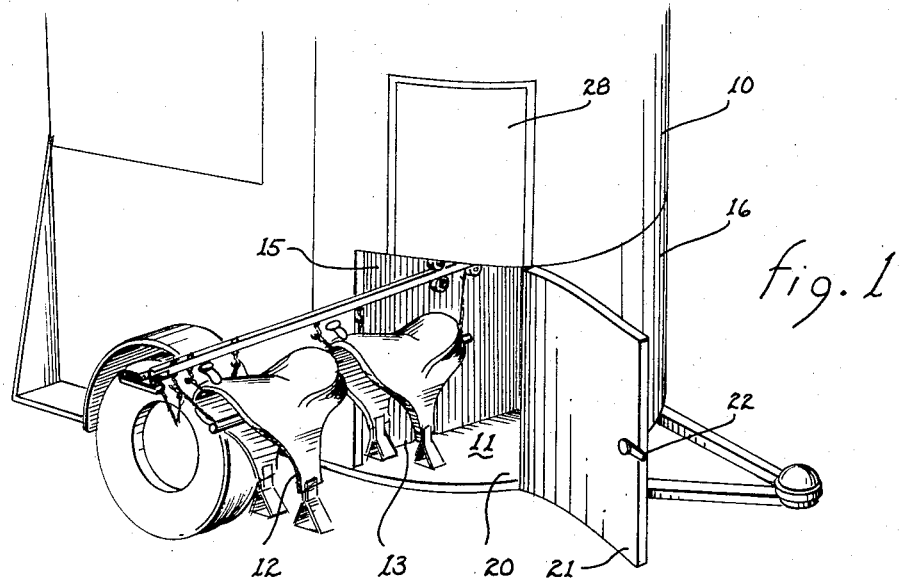
FIG. 1 is a perspective view of a portion of a horse trailer showing the saddle hanger of the present invention mounted therein.

Referring now to the drawings, a horse trailer 10 is shown having a compartment generally shown at 11; the compartment 11 is usually of sufficient size to accommodate two saddles 12 and 13 mounted in tandem transversely of the trailer. The compartment 11 usually includes a rear wall 15 and a front wall 16 formed by the contour of the front of the horse trailer 10. An opening 20 is provided for access to the compartment 11 and a door with a suitable locking mechanism is provided to secure the contents of the compartment. The compartment also includes a ceiling 25 which in most instances will also form the bottom of a feed bin (not shown) so that horses occupying the horse trailer may be fed through a second door 28.

An elongated support beam 35 is movably mounted in the compartment 11 below the ceiling 25. Any convenient means may be utilized for mounting the support beam 35; in the embodiment chosen for illustration, a mounting bar 36 may be fastened in any conventional manner to supporting blocks 38 and 39 which, in turn, are secured to either the ceiling 25 of the horse trailer or to other suitable mounting points, such as frame members (not shown) usually positioned adjacent the outside surface of the compartment. The mounting bar supports a plurality of pairs of rollers 42–43, 44–45, 46–47. The rollers are mounted upon depending support straps 50 which, in turn, are secured to the mounting bar 36. Each roller of each pair of rollers 42–47 contacts the beam 35 on opposite sides to support the beam while nevertheless permitting the beam to move longitudinally thereof.

The support beam 35 may be constructed in numerous ways; however, in the embodiment chosen for illustration, the support beam is formed of angle iron member 52 secured to a plate 53 with a spacer member 54 positioned therebetween. This structure may be seen to provide a "track" in which the rollers contact the beam 35 while the plate 53 and angle iron member 52 prevent the bar from being disengaged from the rollers. One leg of the L-shaped cross section of the angle iron member 52 extends horizontally from the area of the rollers to provide a convenient surface for the attachment of bolt hooks 58 as will be described more fully hereinafter.

It may therefore be seen that the elongated support beam 35 is movable longitudinally thereof so that it can be extended outside the compartment 11 through the opening 20. The support beam is also provided with a handle 60 to permit convenient grasping thereof to extend the beam. The beam may also be locked in place when it is moved back into the compartment through the means of a spring latch 65 incorporating a spring-loaded bolt latch 68 that extends through an opening in a mounting plate 69 into a corresponding latch hole 70.

Figure 2:
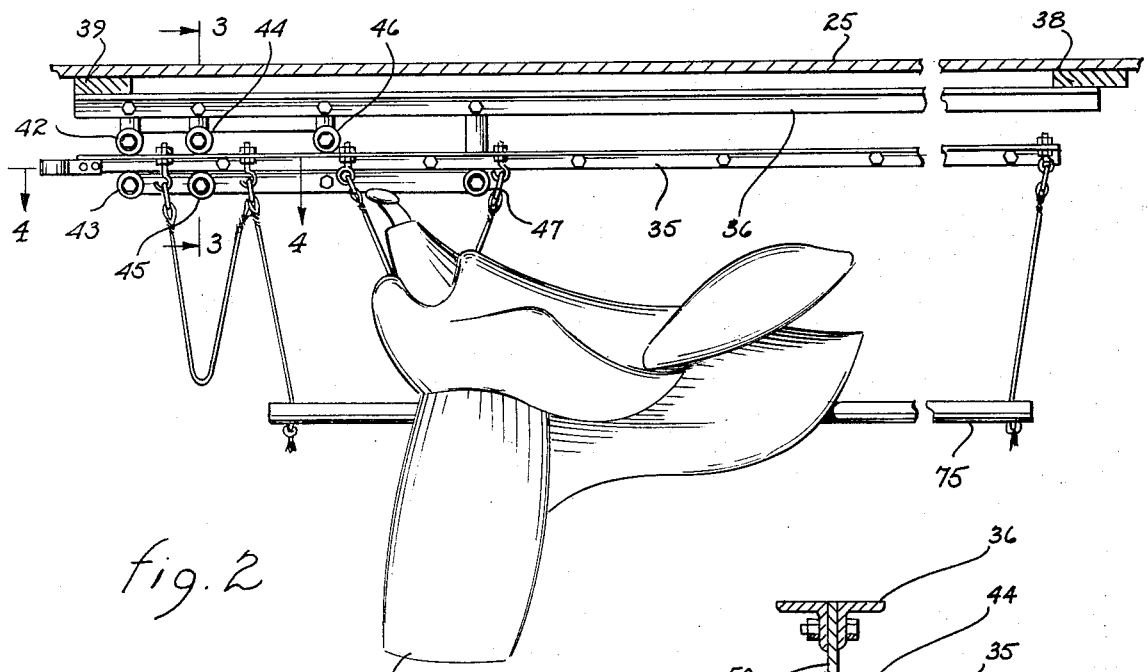
FIG. 2 is a side elevational view of a saddle hanger constructed in accordance with the teachings of the present invention.
Figure 3:
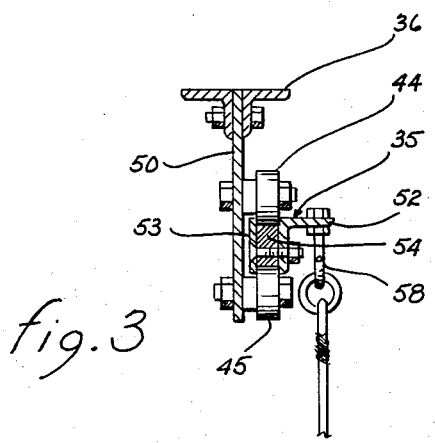
FIG. 3 is a cross-sectional view of FIG. 2, taken along line 3—3.
Figure 4:
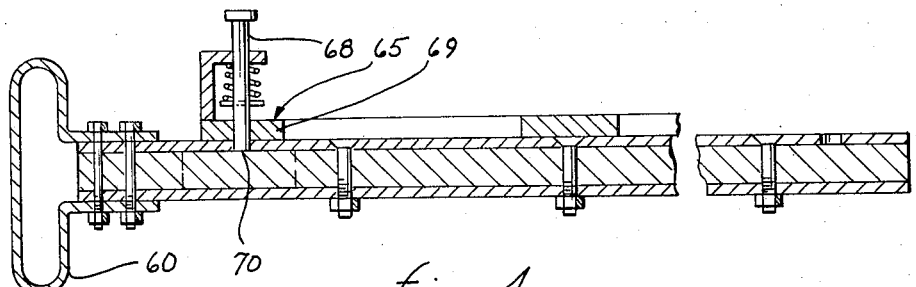
FIG. 4 is a cross-sectional view of FIG. 2, taken along line 4—4.
Figure 5:
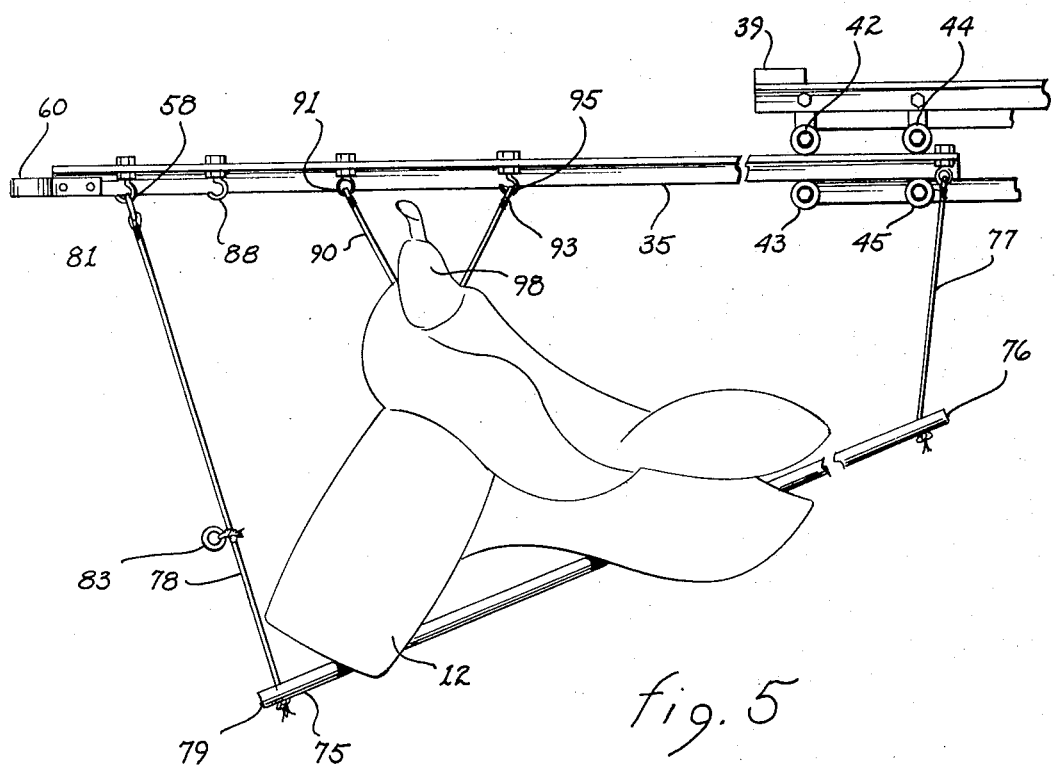
FIG. 5 is a side elevational view of the saddle hanger constructed in accordance with the teachings of the present invention, showing the apparatus in its extended position.

An elongated saddle support bar 75 is suspended adjacent one end 76 by a flexible cord 77 attached to the support beam 35. A second flexible cord 78 is secured adjacent the end 79 of the bar 75 and is also connected to the support beam 35. It may be noted that the flexible cord 78 is provided with O-rings 81 and 83. The O-rings are engageable with bolt hooks 58 and 88. It may be seen that when the O-ring 81 is connected to the bolt hook 58 as shown in FIG. 5, the saddle support bar 75 is tilted downwardly to conveniently enable a saddle 12 to be positioned between the saddle support bar 25 and the support beam 35. When the support bar is to be raised to a position parallel to the beam 35, the O-ring 83 is engaged with the bolt hook 88 as shown in FIG. 2. The saddle support bar 75 may be formed of enumerable materials and be formed from different shapes; however, in the embodiment chosen for illustration, a simple wooden dowel is utilized since the support bar need not carry a substantial amount of weight, as will become apparent hereinafter.

A flexible saddle support line 90 is secured at one end 91 to the support beam 35 and is provided with an O-ring 93 at the opposite end thereof. The O-ring 93 is engageable with a bolt hook 95. When a saddle is to be supported in the apparatus of the present invention, the support line 90 is threaded through the opening in the saddlebow 98 and the O-ring 93 is then engaged with the bolt hook 95. The greatest percentage of the weight of the saddle 12 is thus supported by the support line 90. The line 90 may be formed of any conventional flexible material and may take the form of a simple nylon cord, rope or even flexible metal cable suitably encased in plastic to prevent chafing of the saddlebow 98.

When the saddle 12 has thus been supported by the line 90, the O-ring 83 is engaged with the bolt hook 88 which causes the saddle support bar 75 to engage and support the rear portion of the saddle 12 as shown in FIG. 2. It may be noted that while the saddle is in this position, it cannot be dislodged from the supporting apparatus. The second saddle 13 is mounted in the manner described above in connection with the saddle 12.

The entire apparatus weighs only a fraction of the bulky and cumbersome prior art structures, while the apparatus occupies very little space; indeed, when saddles are not being carried in the compartment 11, the saddle support bar 75 may readily be removed to make available nearly the entire volume of the compartment 11 for other purposes. Supporting the front portion of the saddle with a support line while supporting the rear portion of the saddle with a saddle support bar enables the utilization of an extremely light-weight support bar which, unlike prior art designs, may be constructed of a very light wooden dowel.

I claim:

1. A saddle hanger for supporting saddles in a storage compartment, said compartment having a ceiling and a side with an opening, said hanger comprising: an elongated support beam; means movably mounting said beam in said compartment below said ceiling, said beam movable longitudinally thereof to extend outwardly from said compartment through said opening; an elongated saddle support bar for engaging and supporting the rear portion of a saddle and having a first and a second end; first means secured to said beam supporting said first end of said saddle support bar a predetermined distance below said beam; second means secured to said beam supporting said second end of said saddle support bar a predetermined distance below said beam; and a flexible saddle support line having one end secured to said beam and another end detachably secured to said beam for engaging and supporting the front portion of a saddle.

2. The combination set forth in claim 1, wherein said first and second means secured to said beam supporting said saddle support bar are flexible cords.

3. The combination set forth in claim 1, wherein said first means secured to said beam supporting said first end of said saddle support bar is detachable from said beam.

4. The combination set forth in claim 1, wherein said first means secured to said beam supports said first end of said saddle support bar at either of two predetermined positions displaced from said beam, the first position rendering said saddle support bar parallel to said beam and the second position rendering said first end of said saddle support bar further from said beam than said second end of said saddle support bar to thereby facilitate positioning a saddle between said saddle support bar and said beam.

5. The combination set forth in claim 1, including a plurality of bolt hooks secured to said beam and wherein said first means secured to said beam is a flexible cord having O-rings secured thereto for engaging said hooks.

6. The combination set forth in claim 1, wherein said means movably mounting said beam comprises a plurality of pairs of rollers extending downwardly from said ceiling, the rollers of each pair of rollers engaging said beam on opposite sides thereof to support said beam and permit the beam to extend longitudinally thereof from said compartment.

7. The combination set forth in claim 5, wherein said saddle support line has an O-ring secured to the detachable end thereof and is detachably secured to said beam by engaging said O-ring with one of said bolt hooks.

* * * * *